UNITED STATES PATENT OFFICE.

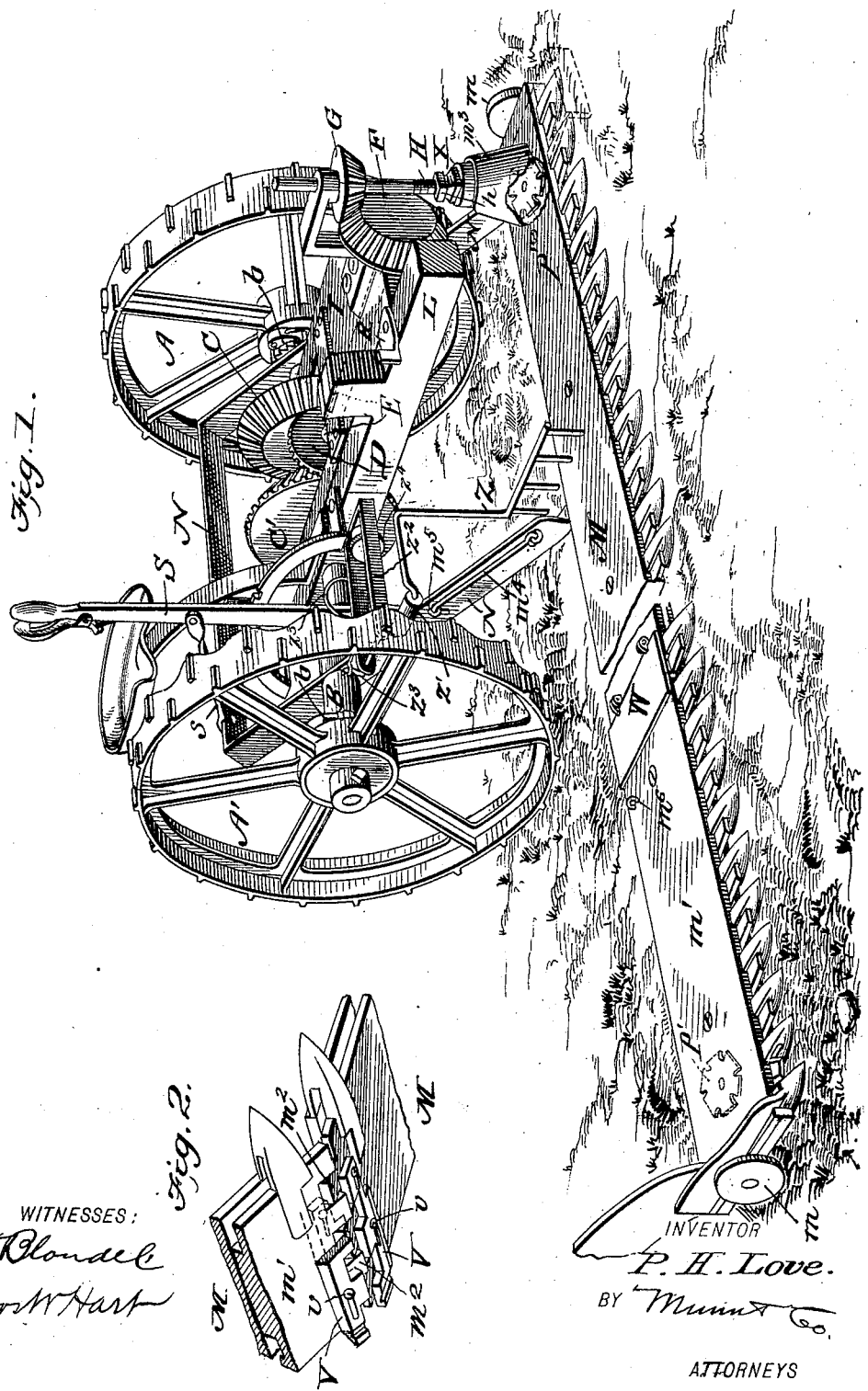

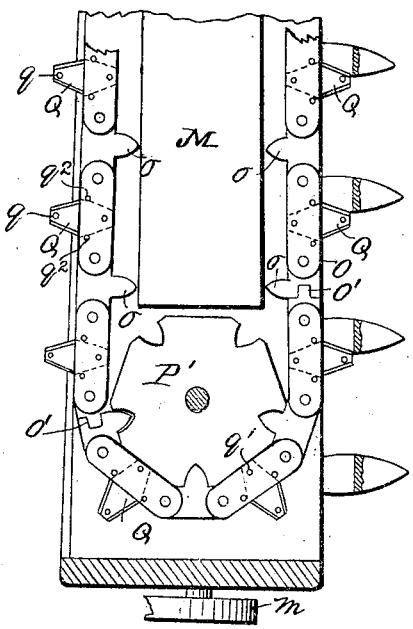
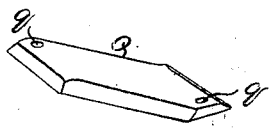
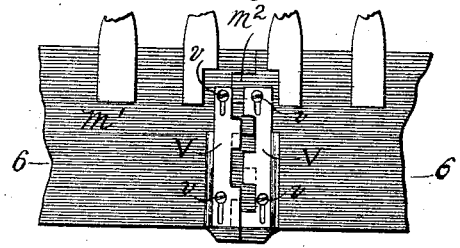
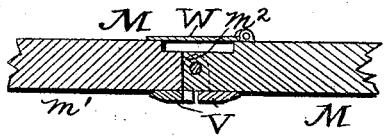

PATRICK HENRY LOVE, OF FRANKLIN, TEXAS.

MOWER OR REAPER.

SPECIFICATION forming part of Letters Patent No. 682,875, dated September 17, 1901.

Application filed October 4, 1900. Serial No. 31,979. (No model.)

*To all whom it may concern:*

Be it known that I, PATRICK HENRY LOVE, a citizen of the United States, residing at Franklin, in the county of Robertson and State of Texas, have made certain new and useful Improvements in Mowers or Reapers, of which the following is a specification.

My invention is an improvement in that class of mowers, reapers, &c., which are provided with endless flexible cutter-bars. The several features of the improvement are as hereinafter set forth.

In the accompanying drawings, Figure 1 is a perspective view of the machine with the finger-bar lowered as in use. Fig. 2 is a perspective view illustrating the joint in the finger-bar and the adjustment of the locking device for supporting the outer end of the finger-bar in alinement. Fig. 3 is a horizontal section of a portion of the finger-bar. Fig. 4 is a perspective view of one of the reversible knives or sickles. Fig. 5 is a plan view of the jointed portion of the finger-bar, showing the locking devices adjusted for holding the two parts of the finger-bar in alinement. Fig. 6 is a longitudinal section on the line 6 6 of Fig. 5.

The transporting-wheels A A' are mounted loose on the axle B and operatively connected therewith by pawl and ratchet $b$, as shown in Fig. 1. Two beveled driving-gears C C' are keyed on shaft B and separated by a space sufficient to receive the smaller bevel-gear D and to allow the shifting of the said gear according as it is desired to drive the cutter-bar in one direction or the other. The said gear D is keyed on a shaft E, which carries a larger bevel-gear F at its front end, and this in turn meshes with a gear G, keyed upon a vertical shaft H, that drives a cutter-bar. The said shaft E is arranged in the portion I of the frame which is hinged on the axle B and adapted to swing vertically. Said shaft E is adapted to be shifted laterally at its inner end to carry the gear D into and out of engagement with the driving-gears C C'.

The tongue or pole L is mounted loosely on the axle B. The finger-bar M is rigidly attached to a frame N, composed of parallel bars which swing on the axle and extend in rear of the same, their rear ends being rigidly connected. The said finger-bar M is provided with a groove extending around the same and adapted to receive the flexible jointed traveling cutter-bar O. A chain gear P (indicated by dotted lines, Fig. 1) is arranged at the inner end of the finger-bar, and a corresponding gear P' (see Fig. 3) is arranged at the outer end of said finger-bar. These similar gears P P' are provided with peripheral notches to receive projections or teeth $o$, formed on certain links of the traveling cutter-bar. It is apparent that through the medium of the driving and transporting wheels A, the axle B and gear C or C', and the gearing D E F G and shaft H rotation will be imparted to the chain gear P and the flexible cutter-bar be thereby caused to travel. Every second link of the cutter-bar O is formed of two parallel plates and carries a reversible knife or sickle Q, and the several knives work in slots in the fingers of the finger-bar in the usual way. Each of the knives or cutters Q is practically lozenge-shaped and has two cutting edges on each side of the middle and a hole $q$ at each end to receive a fastening-screw. As shown in Fig. 3, one-half of each knife or sickle enters a socket in a link of the cutter-bar—that is to say, between two screws $q^2$—and is secured in place by the screw $q'$. By this means the knives or sickles Q are held securely and at the same time are adapted to be removed without difficulty and at a small loss of time and to be reversed so as to present sharp cutting edges. By this construction and arrangement of the knives Q and by the adaptation of the cutter-bar for the reversal of its traveling movement it is apparent that the machine may be used for a comparatively long time without requiring resharpening of the knives, since there are practically four cutting edges available for use.

In the practical use of the machine the tongue L is supported horizontally, and the finger-bar M is supported on the ground by wheels $m$, (see Fig. 1,) which are arranged at its respective ends. The swinging frame I may be locked down, so that its upper surface is parallel with its tongue, by means of a catch R, which is pivoted to the tongue and provided with a projection for convenience in swinging the same into position.

The frame I is shown locked down in Fig. 1; but it is apparent that it may be raised so that the catch R will engage its under side, and thus hold it elevated at an angle to the tongue L.

To raise the finger-bar M, I employ a hand-lever S, which is pivoted to the tongue L and provided with a rod $s$, whose rear end is attached to the rear portion of the frame N loosely. It is obvious that by pulling on the lever S the frame N may be raised and also the finger-bar raised, as required. At the same time the operator may put his weight on N at rear of the seat. The finger-bar M is jointed at a point nearly in front of the inner transporting-wheel A, so that its outer end $m'$ may be held raised, as required, when the machine is not in use or when the same is to be transported or stored. The construction of the joint is illustrated in Figs. 2, 5, and 6 and also the means for locking the two jointed portions in alinement. As shown best in Figs. 2 and 5, each portion of the finger-bar is provided with a series of tongues $m^2$ and intermediate spaces or grooves, and the pivot or pintle passes through the alined series of tongues $m^2$, which are in line with the finger-bar. On each side of the joint and on the under side of the finger-bar is arranged a slidable locking device V, the same consisting of a flat metal bar provided with tongues and spaces corresponding to the arrangement of the tongues and spaces of the finger-bar. Each of said locking devices is provided with lengthwise slots to receive the fastening and clamping screws $v$. It will be seen from Fig. 5 that when these locking devices are adjusted, as there shown, to cover the tongues of the respective hinged portions of the finger-bar the said portions will be held in alinement, as in Fig. 1. To hold the finger-bar raised at an angle, I employ a hook $m^4$, (see Fig. 1,) which may be hinged to frame N and engages a staple $m^5$ when not in use. In use it engages a staple $m^6$ on the cutter-bar. The rear ends of the locking devices V are provided with transverse nicks or grooves to form handholds for convenience in adjusting them, as above described. When the portions of the cutter-bar are alined, the rabbet or gap which is necessarily formed on the upper joint is covered by a hinged plate W. (See Figs. 1 and 6.)

It is obvious that the cutter-bar O must be jointed to adapt it to bend and assume the required angle with the outer end $m'$ of the finger-bar when raised. I therefore provide a joint $o'$ at every third short link which has no tooth. It is to be understood that the driver will take care that the cutter-bar is so adjusted previous to raising the outer end $m'$ of the finger-bar that two of the joints of the cutter-bar shall be opposite each other and in exact alinement with the joint of the finger-bar. The cutter-bar is so constructed relative to the gears P P' and to the jointed portion $m'$ of the finger-bar that two of the joints of the cutter-bar may always be brought into the local relation above described.

In order to prevent serious damage to the cutter-bar in case of the knives meeting with a stone or large root or other obstruction which they cannot sever, I provide a friction-clutch between the shaft H and gear P, which allows the latter to rotate independently in case of need. A hood $m^3$ is applied to cover the friction-clutch and prevent the grass from coming in contact with the same. It may also be extended, as shown by dotted lines, Fig. 1, to cover the two fingers in front, or said fingers may be removed altogether and the hood $m^3$ extended, as stated. The grass tends to lodge on the inner arm of the frame N, and to prevent this I employ the vibrating rake Z. (See Fig. 1.) The rake proper is attached to an angular rod, which is provided with a crank carrying an antifriction-roller $z'$, and is journaled in a bracket $z^2$, attached to the side of the tongue L and projecting laterally, as shown. The roller $z'$ works in engagement with the scalloped or sinuous edge of the wheel A', and thus the rake is vibrated with due rapidity as the machine advances and sweeps the grass first one way and then the other on the finger-bar M, so that no lodgment is effected on the frame N. In order to hold the roller in working contact with the wheel A', I attach a tension-spring $z^3$ to an upwardly-bent arm of the rake and secure the inner end of said spring to the bracket $z^2$. The bracket $z^2$ is secured to the tongue by means of a clamp-screw $z^4$ and may therefore be readily detached when required.

The cover of the finger-bar M is made removable to allow access to the cutter-bar for examination or repair, &c.

Having thus described my invention, what I claim as new, and desire to secure by Letters Patent, is—

1. In a mower or reaper, the combination of the finger-bar having a fixed portion and an outer portion which is hinged to the other so as to be raised or folded in a vertical plane, and an endless traveling cutter-bar arranged within such finger-bar and provided with transverse joints which when brought into alinement with the joint of the finger-bar enable the cutter-bar to be folded with the latter, substantially as shown and described.

2. In a mower or reaper, the combination of a finger-bar having a transverse joint which permits folding in a vertical plane, and an endless traveling cutter-bar having similar transverse joints, and chain-wheels upon which the cutter-bar is adapted to run, the parts being so proportioned and constructed that when the cutter-bar is properly adjusted the joints in the opposite sides of the same will aline with the joint of the finger-bar, substantially as shown and described.

3. In a mower or reaper, the combination, with a finger-bar having a transverse joint, of locking devices applied thereto, fixed projections of the finger-bar proper which are engaged by such devices, to hold the outer end of the finger-bar alined with the fixed part, substantially as shown and described.

4. In a mower or reaper, the combination, with a finger-bar formed in two parts, which are joined together and provided at their meeting ends with tongues and intervening grooves, of slidable locking devices applied on the sides of the joints and adapted to engage the said tongues, substantially as shown and described.

5. In a mower or reaper, the combination, with a finger-bar having a transverse joint as specified, and provided with tongues and intervening grooves at the said joint, of locking devices provided with corresponding tongues and intervening grooves, and arranged laterally of the joint, the said devices being adapted to slide lengthwise, whereby their projections may be brought into engagement with the tongues of the finger-bar sections, for holding the outer end of the finger-bar in alinement, as required, substantially as shown and described.

6. The combination with the cutter-bar links provided with two vertical screws placed near the outer edge, and a vertical perforation located near the inner edge of the links in triangular relation to said screws, of a lozenge-shaped cutter having its inclined edges sharpened as described, and provided with a perforation at each end, the said cutter fitting between the screws and its perforation coinciding with that in links, as and for the purpose specified.

7. The combination of the lozenge-shaped cutter having four beveled edges and a vertical perforation in each end, with the cutter-bar having sockets and a vertical perforation at the inner end of such socket, whereby, when either triangular end of the cutter is placed in the socket it may be secured by a screw, as shown and described.

PATRICK HENRY LOVE.

Witnesses:
  W. W. WILSON,
  TOM M. TAYLOR.